United States Patent [19]
Cochran

[11] 3,982,273
[45] Sept. 21, 1976

[54] SWITCHING ARRANGEMENT FOR FLESH TONE CORRECTION AND CHROMINANCE OVERLOAD CONTROL CIRCUITS

[75] Inventor: Larry Allen Cochran, Indianapolis, Ind.

[73] Assignee: RCA Corporation, New York, N.Y.

[22] Filed: May 27, 1975

[21] Appl. No.: 580,715

[52] U.S. Cl. .................................. 358/27; 358/28; 358/36
[51] Int. Cl.² ........................................ H04N 9/535
[58] Field of Search ...................... 358/40, 28, 27, 36

[56] References Cited
UNITED STATES PATENTS

| | | | |
|---|---|---|---|
| 3,729,578 | 4/1973 | Slusarski | 358/28 |
| 3,764,734 | 10/1973 | Srivastava et al. | 358/27 |
| 3,864,723 | 2/1975 | Carpenter | 358/28 |
| 3,877,067 | 4/1975 | Furrey | 358/27 |
| 3,936,869 | 2/1976 | Jirka | 358/27 |

*Primary Examiner* — John C. Martin
*Attorney, Agent, or Firm* — Eugene M. Whitacre; Kenneth R. Schaefer

[57] ABSTRACT

Switching apparatus is included in a color television receiver for changing the threshold of a saturation overload detector and simultaneously changing the gain characteristics of an associated chrominance signal amplifier. The overload detector is operative to limit chrominance signals at a lower level when noisy signals are present and at a higher level when relatively noise-free signals are present. The switching apparatus is arranged to avoid annoying large shifts in picture saturation upon its operation. An associated flesh tone correction circuit is enabled by the switching apparatus when the lower overload limit is employed and is disabled when the higher limit is employed.

5 Claims, 1 Drawing Figure

U.S. Patent   Sept. 21, 1976   3,982,273
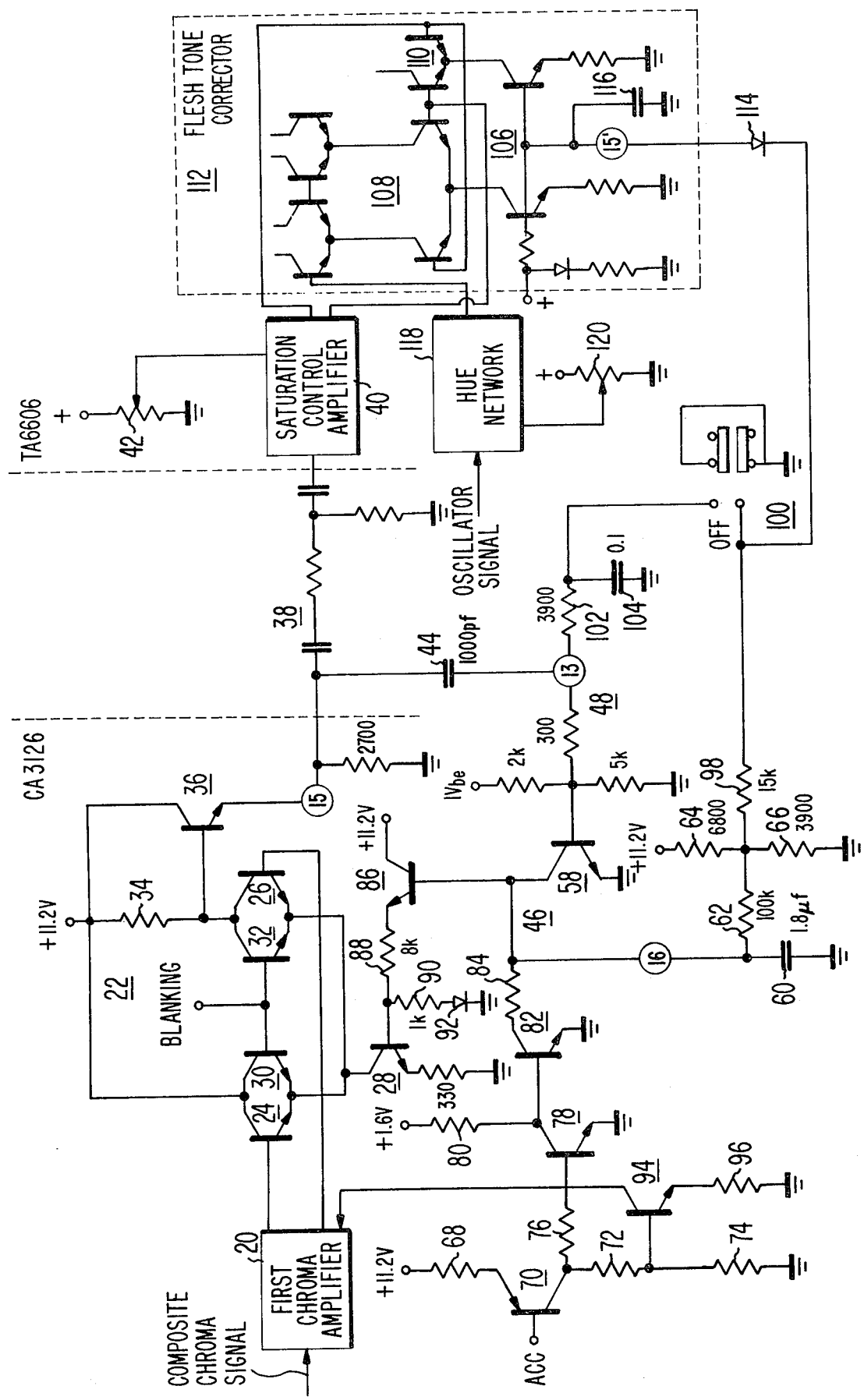

SWITCHING ARRANGEMENT FOR FLESH TONE CORRECTION AND CHROMINANCE OVERLOAD CONTROL CIRCUITS

This invention relates to color television signal processing apparatus and, in particular, to systems for enabling and disabling operation of automatic flesh tone correction and chrominance signal overload prevention circuits in such apparatus.

An automatic chrominance signal gain control (ACC) system is described in U.S. Pat. No. 3,740,462, granted June 19, 1973, in the name of L. A. Harwood, which includes a burst amplitude detector for providing chrominance gain control signals and a peak chrominance signal level detector for providing additional gain control signals. The latter gain control signals will respond to noise as well as to picture information and serve to prevent oversaturation during reception of noisy color signals. This type of arrangement is sometimes referred to as a chrominance overload protection system. The more conventional ACC system provides correction for undesired deviations from a predetermined amplitude relationship between the color reference burst and a maximum chrominance signal. Deviations in burst to chroma ratio may be encountered as a result of errors in transmission of the color television signals.

An additional transmission error which may be encountered relates to the relative phase of the color burst as compared to the chrominance signal. Such phase errors are particularly discernible by a viewer when observing reproduction of flesh tones, a hue which is more readily identified in the image than most others. A number of flesh tone correction circuits have been proposed to minimize such phase discrepencies for colors in the vicinity of flesh (i.e., an orange tone identified as substantially coincident with the "+I" axis in color television terminology). A particularly advantageous dynamic flesh tone correction system is described in U.S. Pat. No. 3,663,744, granted May 16, 1972, to the same L. A. Harwood. Each of the Harwood patents is assigned to the same assignee as the present invention.

In the case where transmitted signals are maintained with appropriate phase and amplitude relationships and the received signal strength is such that relatively noise-free chrominance signals are available, it is desirable to afford to the viewer the opportunity to disable the chrominance overload and flesh tone correction circuitry. An enhanced range of chrominance signal amplitudes (saturation) and phase angles (hue) will then be available for optimum color reproduction.

In accordance with the present invention, a system is provided in a color television receiver for altering operating characteristics of included chrominance signal processing apparatus. The signal processing apparatus includes at least one gain controllable chroma amplifier and a picture interval signal detector. The detector responds to peaks of the chrominance signal which exceed a predetermined level and provide a resultant gain control signal to the amplifier. Additionally, a source of quiescent direct gain control voltage is coupled to the amplifier to set its nominal gain. Switching apparatus is coupled to the detector and to the source of quiescent gain control voltage for simultaneously altering the peak detection level and the quiescent gain control voltage so as to increase permissible peak excursions of the chrominance signals while relatively maintaining the level of other portions of the chrominance signals so as to avoid abrupt changes in chrominance levels when the switching apparatus is operated.

In accordance with a further aspect of the invention, a flesh tone correction system is included in the signal processing apparatus for compressing the gamut of colors in the vicinity of the orange or "+I" axis. The switching apparatus is arranged to disable the flesh tone corrector when the threshold level for the gain control system is increased.

Additional aspects of the present invention will be more readily understood from a consideration of the following description in connection with the accompanying drawing which is a detailed schematic representation, partially in block form, of a chrominance signal processing system embodying the present invention.

Referring to the drawing, a composite chroma (chrominance) signal is coupled to a first chroma amplifier 20. The composite chroma signal comprises an amplitude modulated suppressed subcarrier signal in which phase information is related to hue of image components and amplitude information is related to saturation. The composite chroma signal also includes the color reference burst (at, for example, 3.58 MHz) which is repeated during each line retrace interval. The color burst provides a reference phase for recovery of the information modulated on the suppressed subcarrier as is known.

Amplified push-pull chroma signal outputs from first chroma amplifier 20 are supplied to a second chroma amplifier 22 comprising differentially coupled transistors 24 and 26. A current source transistor 28 is associated with transistors 24, 26. As will appear below, gain control signals are applied to the base of transistor 28 (as well as to first chroma amplifier 20). Blanking signal responsive transistors 30, 32 are coupled across the collector-emitter paths of transistors 24 and 26, respectively, and operate to remove the burst component from the amplified chroma signals produced across a load resistor 34. The blanking pulses may be supplied from a line scanning generator as is known and described in the Harwood U.S. Pat. No. 3,740,462 patent noted above. The resulting picture interval chroma signal produced across resistor 34 is coupled via an emitter-follower transistor 36 to a terminal 15 which corresponds to the similarly labelled terminal of the CA-3126 type chrominance signal processing integrated circuit commercially available from RCA Corporation, Somerville, New Jersey.

A coupling network 38 is provided between terminal 15 and a saturation control amplifier 40 which may, for example, be located on a second integrated circuit of the color demodulator type. The gain of amplifier 40 may be controlled by means of a potentiometer 42. A suitable amplifier of the latter type is described in U.S. patent application Ser. No. 530,405, filed Dec. 6, 1974, in the names of L. A. Harwood and E. J. Wittmann.

The picture interval chroma signal provided at terminal 15 is also coupled via a capacitor 44 to an input terminal 13 associated with a peak detector circuit 46. In peak detector circuit 46, a resistive voltage divider 48 couples chroma signals and bias to the base of a common emitter transistor 58. The collector of transistor 58 is coupled via a terminal 16 to a time constant circuit comprising discrete elements including a capacitor 60, resistor 62 and voltage divider resistors 64, 66. A gain control voltage developed across capacitor 60 is coupled to the base of a transistor 86, the collector of which is coupled to a supply voltage and the emitter of which is coupled via a resistor 88 to the base of current source transistor 28. A resistor 90 and a diode 92 are coupled in series between the base of transistor 28 and a point of reference potential (ground).

Burst-responsive automatic chroma gain control and color killer functions are provided for the chroma amplifiers by means of the circuit elements 68–84. The illustrated circuit elements and their functions are described in detail in the Harwood U.S. Pat. No. 3,740,462 and such description is incorporated herein by reference.

In accordance with the present invention, a switching means 100 is provided for changing the operating conditions of peak detector 46 and for enabling and disabling a flesh tone corrector system 112. Switching means 100 may comprise, for example, a double pole switch in which each of two center contacts are returned to a reference potential (ground). One additional contact is coupled via a threshold setting resistor 102 and terminal 13 to voltage divider 48 which serves to set a threshold bias for peak detector transistor 58. A bypass capacitor 104 is coupled between ground and the end of resistor 102 remote from terminal 13.

A second additional contact of switching means 100 is coupled via a gain reducing resistor 98 to the junction of resistors 64 and 66. The second additional contact is also coupled via an isolating diode 114 and a terminal 15' to a current supply circuit 106 associated with flesh tone corrector 112. A bypass capacitor 116 is coupled from terminal 15' to ground.

Current supply circuit 106 provides operating current to an "I" phase detector 108 and to a chrominance signal limiting circuit 110 which serve to provide operating signals to the flesh tone corrector 112. General aspects of the partially illustrated flesh tone corrector 112 are described in the above-referenced Harwood U.S. Pat. No. 3,663,744, the disclosure of which is herein incorporated by reference. A detailed description of an improved flesh tone correction circuit, also suitable for use with the present invention, is provided in U.S. patent application Ser. No. 580,681 of L. A. Harwood.

In the operation of the illustrated apparatus, chroma signals are amplified by differential transistors 24, 26 and a resulting output signal is provided at terminal 15. Burst components are removed from this output signal by virtue of the conduction of transistors 30 and 32 during each line retrace interval. The gain of amplifier 22 is controlled in response to the peaks of the picture interval chroma signals provided at the terminal 15. The circuit is arranged to reduce the gain of amplifier 22 when such peaks are undesirably large so as to tend to produce oversaturation and "blooming" of the displayed image. Such a result occurs, for example, when a noisy signal, having relatively high amplitude "spikes", is present. To avoid this undesired result, capacitor 44 couples the chroma signals to peak detector transistor 58. Transistor 58 is normally non-conducting. Resistive voltage divider 48 is arranged to provide a fraction of a $V_{be}$ (forward base-emitter conduction voltage) to the base of transistor 58 to thereby determine a threshold for conduction of transistor 58. That is, a quiescent bias potential of approximately 450 to 500 millivolts is supplied at the base of transistor 58 when switch 100 is in the illustrated position (flesh tone correction and overload protection "ON"). This bias potential is insufficient of itself by approximately 200 millivolts to cause transistor 58 to conduct. Thus, positive chroma signal peaks of the order of 200 millivolts or greater are required in order to cause detector transistor 58 to conduct. Signals or noise beyond this predetermined threshold will cause transistor 58 to conduct and thereby discharge capacitor 60.

The voltage across capacitor 60 determines the gain of amplifier 22. The quiescent voltage across capacitor 60 is set by the voltage divider resistors 64 and 66. With the illustrated values of components, this quiescent voltage will be approximately +3.8 volts when switch 100 is in the illustrated position. The voltage across capacitor 60 is coupled to the base of transistor 86 and, in conjunction with resistors 88 and 90 and diode 92, sets the quiescent operating current of transistor 28. Where the circuit values shown on the drawing are employed, a chroma output signal is provided at terminal 15 having a peak-to-peak value of approximately 400 millivolts when switch 100 is "ON".

It should be noted that the color killer portion of the circuit elements 70–84 do not affect the voltage across capacitor 60 during normal reception of color signals. That is, transistor 82 is biased off except when the associated ACC system detects an unacceptably low level of received burst. In that case, transistor 82 conducts, discharging capacitor 60 and thereby causing current source transistor 28 to be cut off. The chroma processing circuit then will be inoperative and the associated receiver will reproduce images only in black and white as is known.

When switch 100 is in the illustrated position ("ON"), flesh tone corrector 112 will be operative to provide the desired compression of the color gamut in the vicinity of flesh tone as is explained in the above-referenced Harwood patent and application. In that case, diode 114 will be reverse biased, the voltage provided by resistors 64 and 66 being more positive than the base bias voltage associated with the transistors of current supply 106 which is coupled to the anode of diode 114.

The above-described mode of operation typically is employed where the received signals may be expected to include annoying chroma noise components and erratic or improper burst to chroma phase relationships. Where, however, the received signals are relatively noise-free and stable, the viewer may disable operation of the flesh tone corrector 112 and simultaneously increase the maximum peak-to-peak level of the chroma output signal by transferring switch 100 to the "OFF" position.

In the latter case, flesh tone corrector 112 will be disabled since the cathode of diode 114 will be returned to ground while its anode is supplied with a positive voltage. Diode 114 will therefore conduct, causing voltages at the bases of the transistors in current supply 106 to be insufficient to render them conductive. Detector 108, limiter 110 and associated circuits in flesh tone corrector 112 then will be disabled.

At the same time, resistor 102 will be connected between terminal 13 and ground, thereby decreasing the quiescent voltage at the base of peak detector transistor 58 to the order of 300 to 350 millivolts. A complementary increase in the maximum peak-to-peak chroma output signal at terminal 15 will then be realized. The overload detector 46 will continue to provide protection against oversaturation on noise spikes but at the higher (more saturated) level.

When the threshold of peak detector 58 is changed in the manner noted above, the chroma signal level at output terminal 15 also may be expected to increase. In order to prevent a radical change in saturation levels in the reproduced image, which could require the viewer to adjust saturation control resistor 42, resistor 98 is also connected across resistor 66 by operation of switch 100 to the "OFF" position. In this manner, the quiescent voltage across capacitor 60 is reduced, thereby reducing the gain of amplifier 22 to maintain the chrominance signals at the same relative levels as those produced when the switch was in the "ON" position.

It should be appreciated that various modifications may be made to the circuit shown without departing from the scope of the present invention.

What is claimed is:

1. In a color television receiver including chrominance signal processing apparatus, a system for altering operating characteristics of said signal processing apparatus comprising:
   at least one chrominance signal amplifier having a controllable gain characteristic;
   signal detection means, coupled to said signal amplifier and responsive to excursions of picture interval chrominance signals having an amplitude exceeding a predetermined level, for providing gain control signals to said signal amplifier;
   a source of quiescent direct gain control voltage;
   means for coupling said gain control signals and said gain control voltage to said amplifier;
   switching means coupled to said detection means and to said source of gain control voltage for simultaneously altering said predetermined level and said quiescent gain control voltage so as to increase permissible peak excursions of said chrominance signals while relatively maintaining the level of other portions of said chrominance signals.

2. Apparatus according to claim 1 wherein
   said switching means is arranged for simultaneously reducing the gain of said amplifier while increasing said permissible peak excursions.

3. Apparatus according to claim 2 wherein
   said detection means includes a biasing circuit for determining said predetermined level, and
   said switching means is coupled to said biasing means for altering said level.

4. Apparatus according to claim 3 wherein
   said source of direct gain control voltage comprises a resistive voltage divider coupled to a source of direct voltage and an additional resistor coupled between said divider and said switching means,
   said switching means being operative to couple said additional resistor across a portion of said divider to reduce said quiescent direct gain control voltage.

5. Apparatus according to claim 1 wherein
   said chrominance signal processing apparatus further comprises a flesh tone correction system for compressing the gamut of colors in the vicinity of orange tones,
   said switching means being coupled to said flesh tone correction system for disabling said flesh tone correction system simultaneously with increasing said permissible peak excursions of said chrominance signals.

* * * * *